US009371003B2

(12) United States Patent
Tran et al.

(10) Patent No.: US 9,371,003 B2
(45) Date of Patent: Jun. 21, 2016

(54) SYSTEMS AND METHODS FOR HAPTIC FEEDBACK CONTROL IN A VEHICLE

(75) Inventors: Daniel Paul Tran, West Bloomfield, MI (US); Justin McBride, West Bloomfield, MI (US); Christopher Alan Arms, Farmington Hills, MI (US); Bo Sun, Novi, MI (US); Carolina Mary Rigney, West Bloomfield, MI (US); Nhi Van Pham, Dearborn, MI (US); Martin Ezequiel Nespolo, Rochester Hills, MI (US); Silviu Pala, Birmingham, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 13/087,547

(22) Filed: Apr. 15, 2011

(65) Prior Publication Data

US 2012/0253593 A1 Oct. 4, 2012

Related U.S. Application Data (60) Provisional application No. 61/470,220, filed on Mar. 31, 2011.

(51) Int. Cl.
*B60K 31/00* (2006.01)
*B60H 1/00* (2006.01)
(Continued)

(52) U.S. Cl.
CPC ........ *B60K 31/0008* (2013.01); *B60H 1/00985* (2013.01); *B60W 50/16* (2013.01); *B60K 2310/20* (2013.01); *B60K 2350/1024* (2013.01); *B60K 2350/1048* (2013.01); *B60W 30/16* (2013.01); *B60W 2550/308* (2013.01); *G06F 2203/015* (2013.01)

(58) Field of Classification Search
None
See application file for complete search history.

(56) References Cited

U.S. PATENT DOCUMENTS 5,044,956 A 9/1991 Behensky et al.
6,004,134 A 12/1999 Marcus et al.
(Continued)

FOREIGN PATENT DOCUMENTS

EP 1610207 A2 * 12/2005 .............. G06F 3/033
EP 2 194 444 A2 6/2010
(Continued)

OTHER PUBLICATIONS

Bayer MaterialScience AG, Electroactive Polymers Providing Tactile Feedback for Touchscreen Devices, published Feb. 4, 2011, pp. 1-2.*

(Continued)

*Primary Examiner* — Fadey Jabr
*Assistant Examiner* — Kevin P Mahne
(74) *Attorney, Agent, or Firm* — Harness, Dickey & Pierce, P.L.C.

(57) ABSTRACT

A control system for a vehicle includes first and second modules. The first module receives input from an operator of the vehicle via an input device, wherein the operator input includes a change to an operating parameter of a vehicle system. The second module selectively adjusts a resistance of the input device based on the operator input and a predetermined threshold. A method for controlling a vehicle includes receiving input from an operator of the vehicle via an input device, wherein the operator input includes a change to an operating parameter of a vehicle system, and selectively adjusting a resistance of the input device based on the operator input and a predetermined threshold.

20 Claims, 9 Drawing Sheets (51) Int. Cl.
*B60W 50/16* (2012.01)
*B60W 30/16* (2012.01)

(56) References Cited

U.S. PATENT DOCUMENTS

| | | | |
|---|---|---|---|
| 6,128,006 | A | 10/2000 | Rosenberg et al. |
| 6,708,099 | B2 * | 3/2004 | Tellis et al. ............... 701/96 |
| 7,327,348 | B2 | 2/2008 | Goldenberg et al. |
| 7,952,261 | B2 | 5/2011 | Lipton et al. |
| 2003/0135317 | A1 * | 7/2003 | Hijikata et al. ............ 701/70 |
| 2003/0188594 | A1 * | 10/2003 | Levin et al. ............. 74/473.12 |
| 2004/0032395 | A1 | 2/2004 | Goldenberg et al. |
| 2006/0103634 | A1 * | 5/2006 | Kim et al. ................. 345/173 |
| 2007/0145818 | A1 * | 6/2007 | Kobayashi et al. ....... 303/113.4 |
| 2007/0235594 | A1 * | 10/2007 | Wingett et al. ............. 244/223 |
| 2007/0276582 | A1 * | 11/2007 | Coughlin ................. 701/123 |
| 2008/0042489 | A1 * | 2/2008 | Lewis et al. .............. 303/152 |
| 2008/0275596 | A1 * | 11/2008 | Tarasinski et al. ........... 701/1 |
| 2009/0001855 | A1 | 1/2009 | Lipton et al. |
| 2009/0018723 | A1 * | 1/2009 | Chevion et al. ............. 701/36 |
| 2009/0244017 | A1 * | 10/2009 | Pala et al. ................. 345/173 |
| 2010/0030458 | A1 * | 2/2010 | Coughlin ................. 701/123 |
| 2010/0250071 | A1 | 9/2010 | Pala et al. |
| 2010/0288072 | A1 * | 11/2010 | Springer et al. .............. 74/552 |
| 2011/0106381 | A1 * | 5/2011 | Filev et al. ................. 701/40 |
| 2011/0111852 | A1 * | 5/2011 | Cohen et al. ................ 463/37 |
| 2011/0115754 | A1 * | 5/2011 | Cruz-Hernandez ......... 345/184 |
| 2011/0261021 | A1 * | 10/2011 | Modarres et al. ........... 345/177 |
| 2012/0206248 | A1 * | 8/2012 | Biggs ..................... 340/407.2 |

FOREIGN PATENT DOCUMENTS

| | | |
|---|---|---|
| JP | 2005-521597 | 7/2005 |
| JP | 2007-191134 | 8/2007 |
| JP | 2009-241924 | 10/2009 |
| WO | WO2010104953 | 9/2010 |

OTHER PUBLICATIONS

Search Report and Written Opinion dated Nov. 29, 2012 in the corresponding PCT Application No. PCT/US2012/026854.

Office Action issued Apr. 22, 2014 in corresponding JP Application No. 2013-544888 (with English translation).

Final Notice of Rejection sent Aug. 15, 2014 in corresponding JP Application No. 2013-544888 with English translation.

Office Action issued in related Japanese Application No. 2013-544888 dated Jan. 23, 2015.

* cited by examiner

SYSTEMS AND METHODS FOR HAPTIC FEEDBACK CONTROL IN A VEHICLE

CROSS-REFERENCE TO RELATED APPLICATIONS

This application claims the benefit of U.S. Provisional Application No. 61/470,220, filed on Mar. 31, 2011. The disclosure of the above application is incorporated herein by reference in its entirety.

FIELD

The present disclosure relates to vehicle control systems and more particularly to systems and methods for haptic feedback control in a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle control systems may communicate with an operator of a vehicle. Specifically, vehicle control systems may receive input from the vehicle operator and/or may generate output for the vehicle operator. The operator input may be received by the vehicle control system via various input devices such as a touchscreen or a button. The output generated by the vehicle control system may be audio and/or visual output. For example, the vehicle control system may display visual directions and/or generate audio directions for the vehicle operator. The vehicle control system, however, may also generate tactile feedback for the vehicle operator, also known as haptic feedback.

SUMMARY

A control system for a vehicle includes first and second modules. The first module receives input from an operator of the vehicle via an input device, wherein the operator input includes a change to an operating parameter of a vehicle system. The second module selectively adjusts a resistance of the input device based on the operator input and a predetermined threshold.

A method for controlling a vehicle includes receiving input from an operator of the vehicle via an input device, wherein the operator input includes a change to an operating parameter of a vehicle system, and selectively adjusting a resistance of the input device based on the operator input and a predetermined threshold.

In other features of the control system and the method, the vehicle system is an adaptive cruise control (ACC) system and the operating parameter is a distance between the vehicle and another vehicle. In other features of the control system and the method, the vehicle system is an audio system and the operating parameter is one of (i) audio volume and (ii) audio data output. In other features of the control system and the method, the vehicle system is a heating, ventilation, and air conditioning (HVAC) system and the operating parameters is a temperature inside a cabin of the vehicle.

In yet other features of the control system and method, the input device is a joystick-based input device that includes one or more direct current (DC) motors, and the resistance of the one or more DC motors is selectively adjusted based on the operator input and the predetermined threshold. In still other features of the control system and method, the input device includes an electroactive polymer (EAP) layer having an associated printed circuit board (PCB) connected underneath, and the PCB is selectively calibrated based on the operator input and the predetermined threshold Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a systemon-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Vehicle control systems may receive input from an operator of a vehicle. Specifically, the vehicle operator may select commands via one or more input devices. These commands may be used in controlling various vehicle systems. Selection of a desired command for the various vehicle systems using the one or more input devices, however, may be difficult. Specifically, when browsing through various commands for a vehicle system it may be difficult for the user to target a desired command. For example, the vehicle operator may repeatedly pass the desired command (e.g., in a list of commands) before finally selecting the desired command.

Accordingly, systems and methods are presented for haptic feedback control in a vehicle. The systems and methods may selectively adjust a resistance of an input device based on input from an operator of the vehicle and a predetermined threshold. For example, the resistance may be adjusted to notify the operator of an undesirable condition. The operator input may indicate a change in an operating parameter of a vehicle system. Specifically, the resistance of the input device may be increased when the change in the operating parameter indicated by the operator input exceeds the predetermined threshold. The resistance of the input device, however, may also be decreased depending on the operator input. In some implementations, the resistance of the input device may be adjusted proportional to the change in the operating parameter indicated by the operator input. The resistance of the input device, however, may also be adjusted according to other suitable methods such as non-linear adjusting (e.g., exponential). Additionally, in some implementations, the resistance of the input device may be selectively adjusted based on the operator input and two or more predetermined thresholds. For example, low/medium/high resistance thresholds may be used.

The vehicle system may be an adaptive cruise control (ACC) system and the operating parameter may be a distance between the vehicle and another vehicle. Alternatively, the vehicle system may be an audio system and the operating parameter may be (i) audio volume or (ii) audio data output. Alternatively, the vehicle system may be a heating, ventilation, and air conditioning (HVAC) system and the operating parameter may be a temperature inside a cabin of the vehicle. In some implementations, more than one of these vehicle systems may operate according to the systems or methods of the present disclosure. Additionally, the vehicle system(s) may include other suitable systems.

The input device may be a joystick-based input device that includes one or more direct current (DC) motors connected to a moveable member. The systems and methods may selectively adjust the resistance of the one or more DC motors thereby affecting a force required to displace the moveable member. Alternatively, the input device may include an electroactive polymer (EAP) layer having an associated printed circuit board (PCB) connected underneath. The systems and methods may selectively calibrate the PCB thereby adjusting the sensing by the PCB of movement across the EAP layer. In some implementations, one or two of these input devices may be implemented on a vehicle steering wheel at locations with respect to thumb fingers of the operator. The input device(s), however, may be other suitable input devices and/or may be located at other suitable locations (e.g., center console, near a shifter, etc.).

Figure 1:
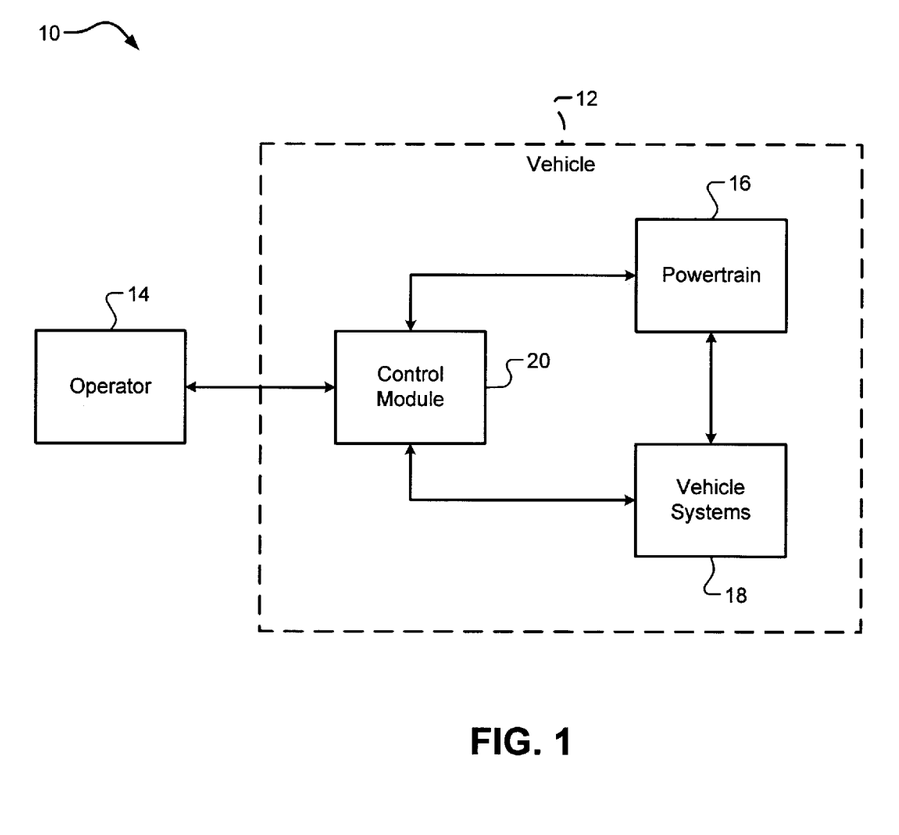
FIG. 1 is a functional block diagram of an example vehicle system according to one implementation of the present disclosure.

Referring now to FIG. 1, an example vehicle system 10 is shown. The vehicle system 10 includes a vehicle 12. The vehicle 12 may be controlled based on input from an operator 14 of the vehicle 12. The vehicle 12 may further include a powertrain 16, vehicle systems 18, and a control module 20. The powertrain 16 may propel the vehicle 12. For example, the powertrain 16 may include an internal combustion engine (ICE) such as a spark-ignition (SI) engine, a diesel engine, or a homogeneous charge compression ignition (HCCI) engine. The powertrain 16 may also be a hybrid system and therefore may further include additional components such as an electric motor and/or a battery system.

The control module 20 controls the powertrain 16 and the vehicle systems 18. For example, the vehicle systems 18 may include, but are not limited to, an ACC system, an audio system, and an HVAC system. The control module 20 may control the powertrain 16 and/or the vehicle systems 18 based on feedback from one or more sensors. In addition, the control module 20 may control the powertrain 16 and/or the vehicle systems 18 based on the input from the operator 14. For example, the control module 20 may control the powertrain 16 based on a position of an accelerator pedal (not shown). Additionally, for example, the control module 20 may control the vehicle systems 18 based on input received from the operator 14 via one or more input devices (not shown).

Figure 2A:
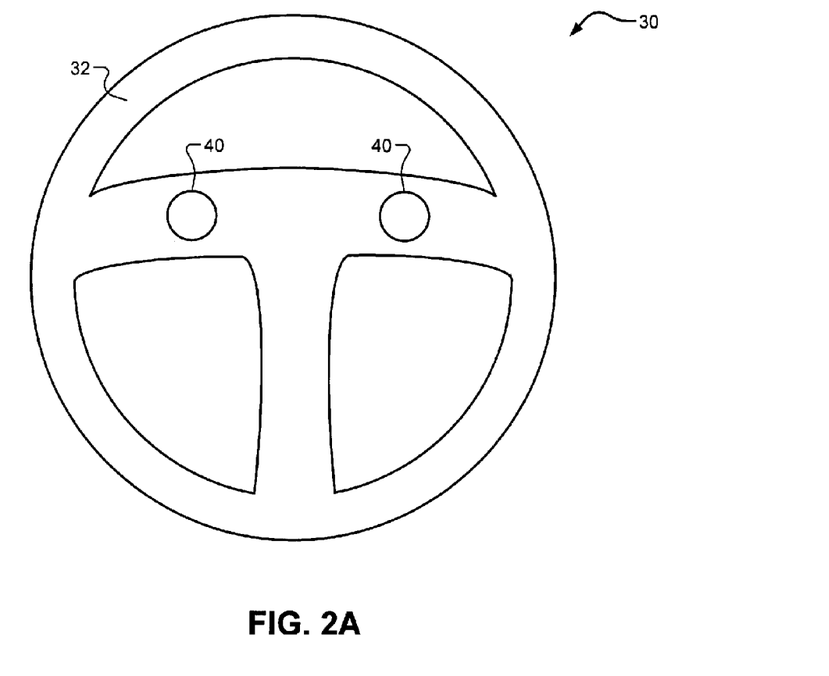
FIGS. 2A-2C are diagrams illustrating an example vehicle steering wheel including input devices and example input paths for the input devices according to one implementation of the present disclosure.

Referring now to FIG. 2A, an example vehicle steering wheel 30 includes a steering wheel 32 having two input devices 40. As shown, the input devices 40 may be located at locations on the steering wheel 32 with respect to thumb fingers of the operator 14. Therefore, the input devices 40 may be controlled by the thumb fingers of the operator 14. However, as previously described, the input devices 40 may be located at other suitable locations.

Figure 2B:
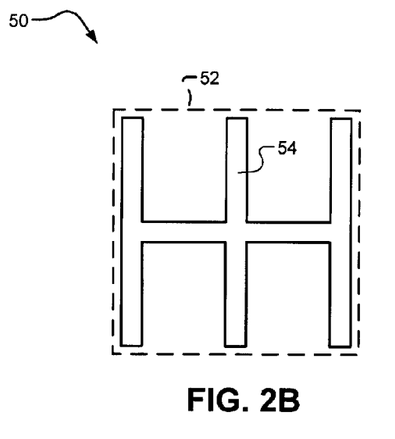
Figure 2C:
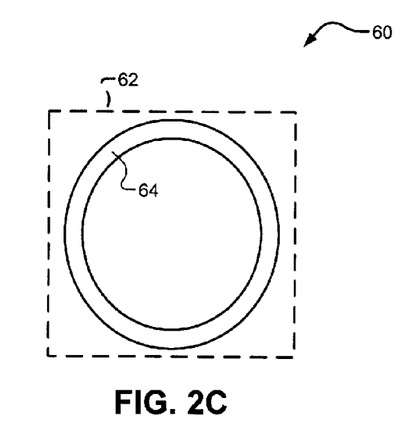

Referring now to FIGS. 2B-2C, example input paths for the input devices 40 are shown. FIG. 2B illustrates a first input path configuration 50. The first input path configuration 50 includes two or more perpendicular axes 54 within a zone of movement 52. Specifically, the operator 14 may input via the input device 40 either horizontally (i.e., an X-axis) or vertically (i.e., a Y-axis). Additionally, more than one vertical path and/or horizontal path may be implemented. For example, FIG. 2B illustrates one horizontal path and three perpendicular vertical paths.

FIG. 2C, on the other hand, illustrates a second input path configuration 60. The second input path configuration 60 includes a circular path 64 within a zone of movement 62. Specifically, the operator 14 may input via the input device 40 either in a clockwise or counterclockwise direction along the circular path 64. While separate configurations 50 and 60 are shown, the input device 40 may receive input via both configurations and/or other suitable path configurations.

Figure 3:
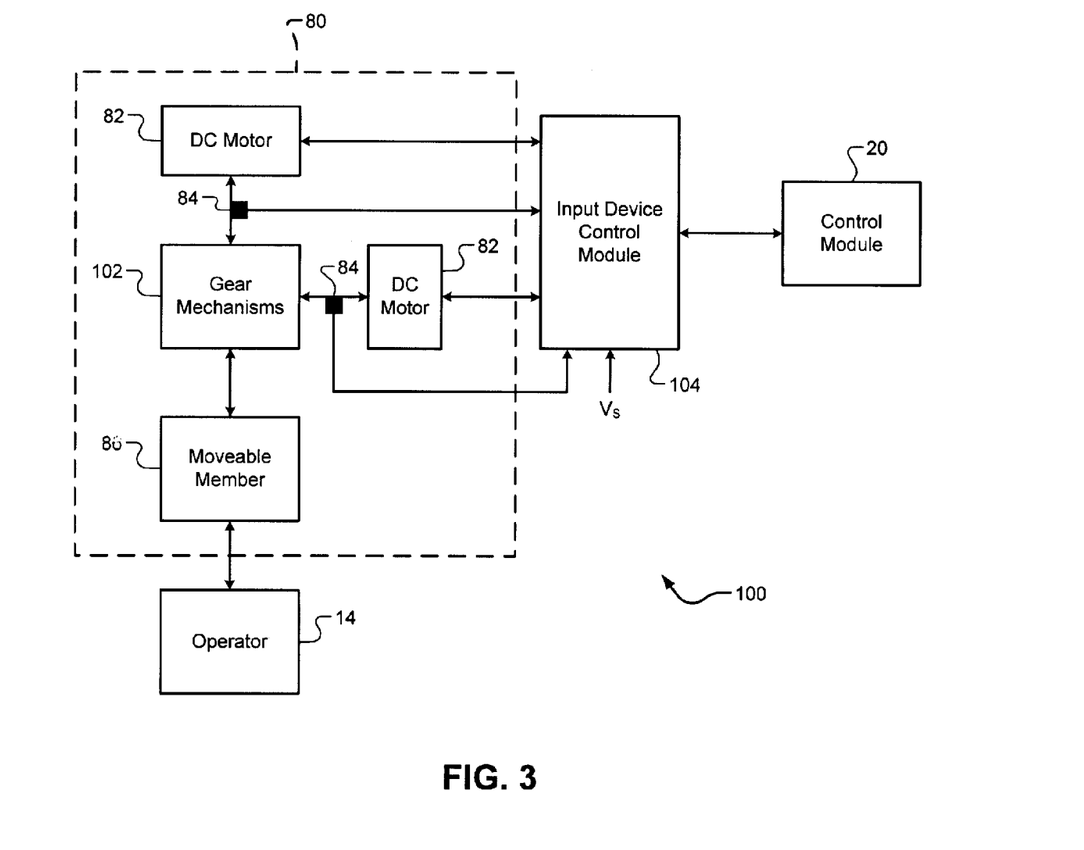
FIG. 3 is a control system of an example joystick-based input device according to one implementation of the present disclosure.

Referring now to FIG. 3, a first example 80 of the input device 40 is shown. The first example input device 80 may also be referred to as joystick-based input device 80. The joystick-based input device 80 includes two DC motors 82 that move based on movement of a moveable member 86. The moveable member 86 may also be referred to as joystick 86 and may be controlled by the operator 14 to provide input. Position sensors 84 measure positions of the DC motors 82, respectively. For example, the DC motors 82 may each rotate a shaft and the position sensors 84 may measure rotational positions of the shafts, respectively.

An example control system 100 for monitoring and controlling the joystick-based input device 80 is also shown. The control system 100 includes an input device control module 104 that receives position measurements from the position sensors 84. The input device control module 104 selectively controls the DC motors 82. For example, the input device control module 104 may increase a resistance of the DC motors 82 thereby increasing a force required to displace the moveable member 86. For example, the force may be increased by 5 Newtons (N).

The input device control module 104 may also communicate with the control module 20 (e.g., via a control module area network, or CAN). For example, the input device control module 104 may send the position measurements to the control module 20. Based on a comparison of the position measurements (i.e., the input by the operator 14) and one or more predetermined thresholds, the control module 20 may command the input device control module 104 to either increase, decrease, or maintain the resistance of the DC motors 82.

Figure 4A:
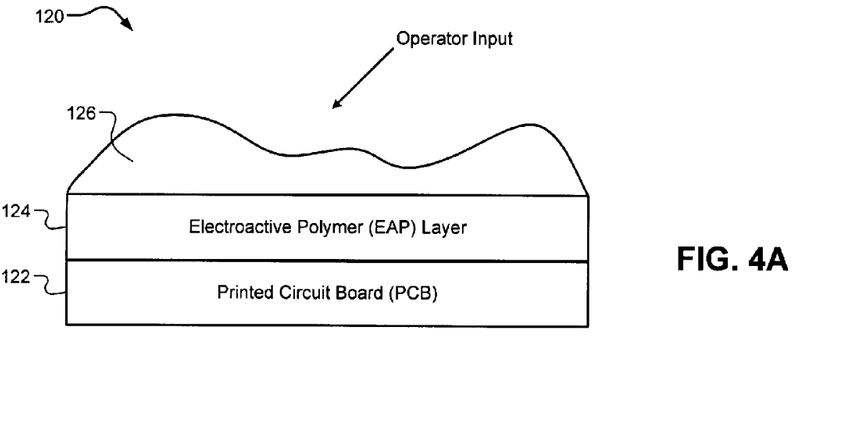
FIGS. 4A-4B are a schematic and a control system of an example electroactive polymer (EAP) based input device according to one implementation of the present disclosure.

Referring now to FIG. 4A, a second example 120 of the input device 40 is shown. The second example input device 120 may also be referred to as EAP-based input device 120. The EAP-based input device 120 may include an EAP layer 124 disposed on top of and electrically connected to a PCB 122. An input mold 126 may be disposed on top of the EAP layer 124. The input mold 126 may have an irregular shape as shown. The input mold 126, however, may also have a symmetrical shape (e.g., a raised outer edge circle and a raised center region). Application of a force to the input mold 126 displaces the EAP layer 124 which is interpreted by the PCB 122 as the input by the operator 14.

Figure 4B:
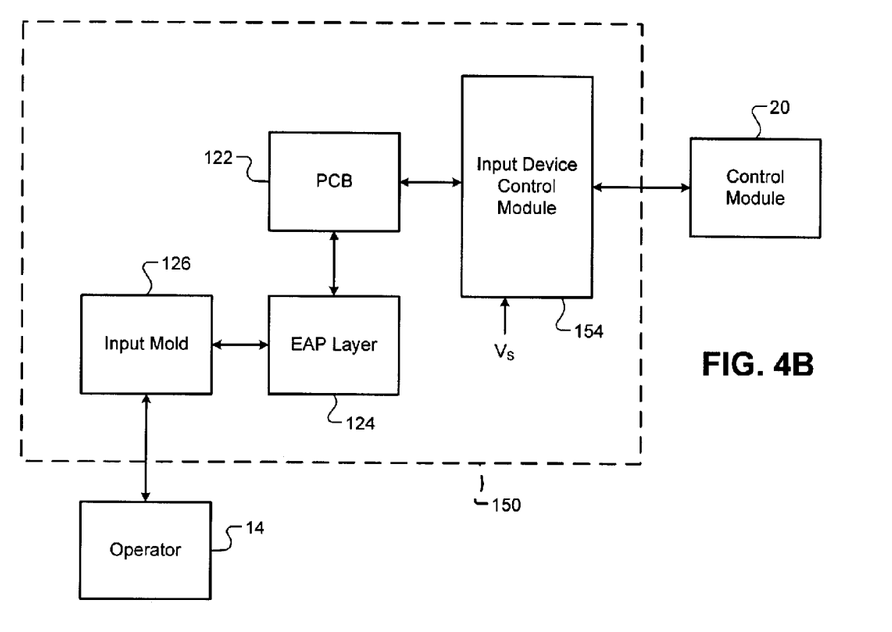

FIG. 4B illustrates an example control system 150 for monitoring and controlling the EAP-based input device 120. The control system 150 includes an input device control module 154 that receives a measured response of the EAP layer 124 from the PCB 122. The input device control module 154 is also configured to selectively calibrate the PCB 122. The input device control module 154 may recalibrate the PCB 122 thereby increasing a force (as interpreted by the PCB 122) required to displace the EAP layer 124 via the input mold 126. For example, the force may be increased by 5 N. Additionally, for example only, the input device control module 154 may decrease a sensitivity of the PCB to thereby increase the required force for displacement.

The input device control module 154 may also communicate with the control module 20 (e.g., via the CAN). For example, the input device control module 154 may send measured response of the EAP layer 124 to the control module 20. Based on a comparison of the measured response (i.e., the input by the operator 14) and one or more predetermined thresholds, the control module 20 may command the input device control module 154 to either recalibrate the PCB 122 (thereby increasing or decreasing the required force) or maintain the current calibration of the PCB 122.

Figure 5:
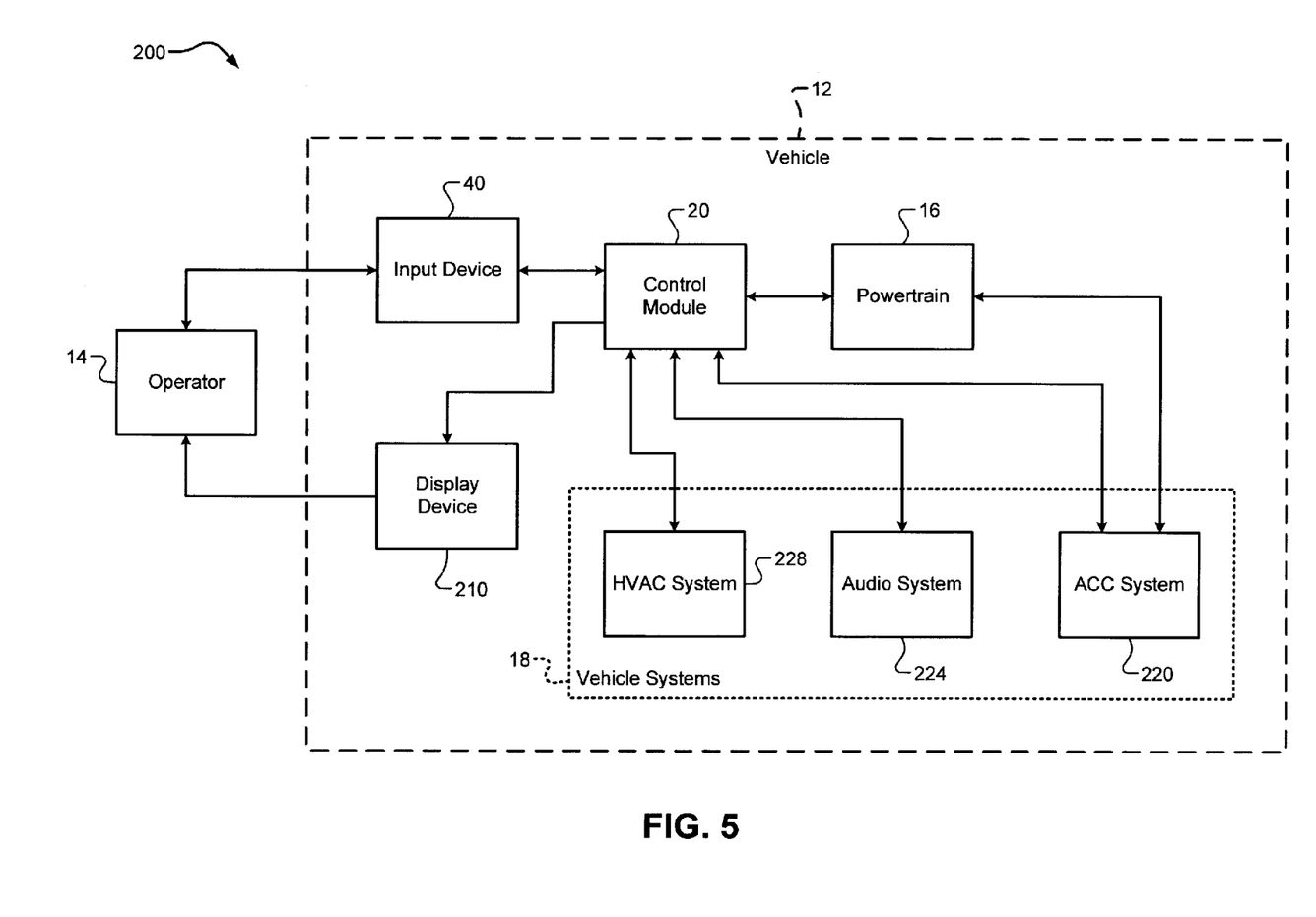
FIG. 5 is a functional block diagram of an example vehicle control system according to one implementation of the present disclosure.

Referring now to FIG. 5, an example control system 200 for the vehicle 12 is shown. Specifically, the control system 200 may implement haptic feedback via the input device 40 for one or more of the vehicle systems 18. The vehicle 12 includes the powertrain 16, the vehicle systems 18, and the control module 20. The vehicle 12 may further include the input device 40 and a display device 210. For example, the vehicle systems 18 may include an ACC system 220, an audio system 224, and/or an HVAC system 228. However, as previously described, the vehicle systems 18 may include other suitable systems. In addition, more than one input device 40 may be implemented (e.g., the vehicle steering wheel of FIG. 2A).

The ACC system 220 may include one or more sensors used to monitor proximity of other vehicles on the road. For example, the one or more sensors may be either radar-based or laser-based. When a vehicle 12 is within a predetermined distance from another vehicle, the ACC system 220 slows the vehicle 12 to maintain the predetermined distance. The predetermined distance, however, may also vary based on operating parameters such as vehicle speed (e.g., increase distance as vehicle speed increases). When the vehicle 12 is greater than the predetermined distance from the other vehicle, the ACC system 220 may again accelerate to a desired speed (while still maintaining the predetermined distance). For example, the desired speed may be input by the operator 14.

The audio system 224 may output audio data for the operator 14. For example, the audio system 224 may output music, audio directions, warnings, etc. The audio system 224 may include speakers and other suitable audio system components. In addition, the audio system 224 may include a storage device for storing digital music. For example, the storage device may be a hard drive or flash memory. The audio system 224 may selectively retrieve and output audio data stored in the storage device (e.g., digital song files).

The HVAC system 228 may control a temperature within a cabin of the vehicle 12. Specifically, the HVAC system 228 may either heat or cool the vehicle 12. The HVAC system 228 may also control airflow within the vehicle 12. The HVAC system 228, therefore, may include an air conditioner, a heater, and one or more fans. The HVAC system 228, however, may also include other suitable HVAC components such as one or more temperature sensors. The HVAC system 228 may periodically adjust the temperature within the vehicle 12 to maintain a desired temperature. For example, the desired temperature may be input by the operator 14.

The control module 20 receives input from the operator 14 via input device 40. The control module 20 communicates with and controls the ACC system 220, the audio system 224, and/or the HVAC system 228 based on the operator input. The operator input, therefore, may indicate a change in an operating parameter of one of the vehicle systems 18 (e.g., vehicle-vehicle distance, audio volume/audio data output, cabin temperature, etc.). The control module 20 selectively adjusts the resistance of the input device 40 based on the operator input and a predetermined threshold. The control module 20 may increase the resistance of the input device when the change in the operating parameter is undesirable (i.e., further from a predetermined level). Similarly, however, the control module 20 may decrease the resistance of the input device 40 when the change in the operating parameter is desirable (i.e., closer to the predetermined level).

As previously described, when the operator input indicates a change in the operating parameter outside of a corresponding predetermined threshold, the control module 20 may increase the resistance of the input device 40. For example, when the operator input commands the ACC system 220 to move the vehicle 12 less than the predetermined distance from the other vehicle, the control module 20 may also increase the resistance of the input device 40. Alternatively, for example, when the operator input commands the audio system 224 to increase the audio volume above a predetermined volume or to scroll through audio data at faster than a predetermined rate, the control module 20 may also increase the resistance of the input device 40. For example, the predetermined volume may be 120 decibels (dB).

Additionally or alternatively, for example, the predetermined volume may vary based on a noise level within the cabin (e.g., based on vehicle speed). The predetermined rate, on the other hand, may vary depending on a method of scrolling (e.g., alphabetical, artist, etc.). Alternatively, for example, when the operator input commands the HVAC system to change the temperature by more than a predetermined amount from the predetermined temperature, the control module 20 may increase the resistance of the input device 40. For example, the predetermined temperature may be 75° Fahrenheit (F). In some implementations, the predetermined temperature may be a temperature to decrease fuel/energy consumption.

The control module 20 may also output data to be displayed to the operator 14 via the display device 210. For example, the display device 210 may be an instrument cluster, a heads-up display (HUD), or a three-dimensional (3D) windshield display. The display device 210 may also be another suitable display device. The display device 210 may display numerical data such as a distance to the other vehicle, the audio level, audio data (e.g., song, artist, etc.), and/or cabin temperature. In addition, the display device 210 may display visual data such as a 3D outline on the windshield of where another vehicle would be at the predetermined distance (for a comparison by the operator 14 to the actual position of the other vehicle).

Figure 6A:
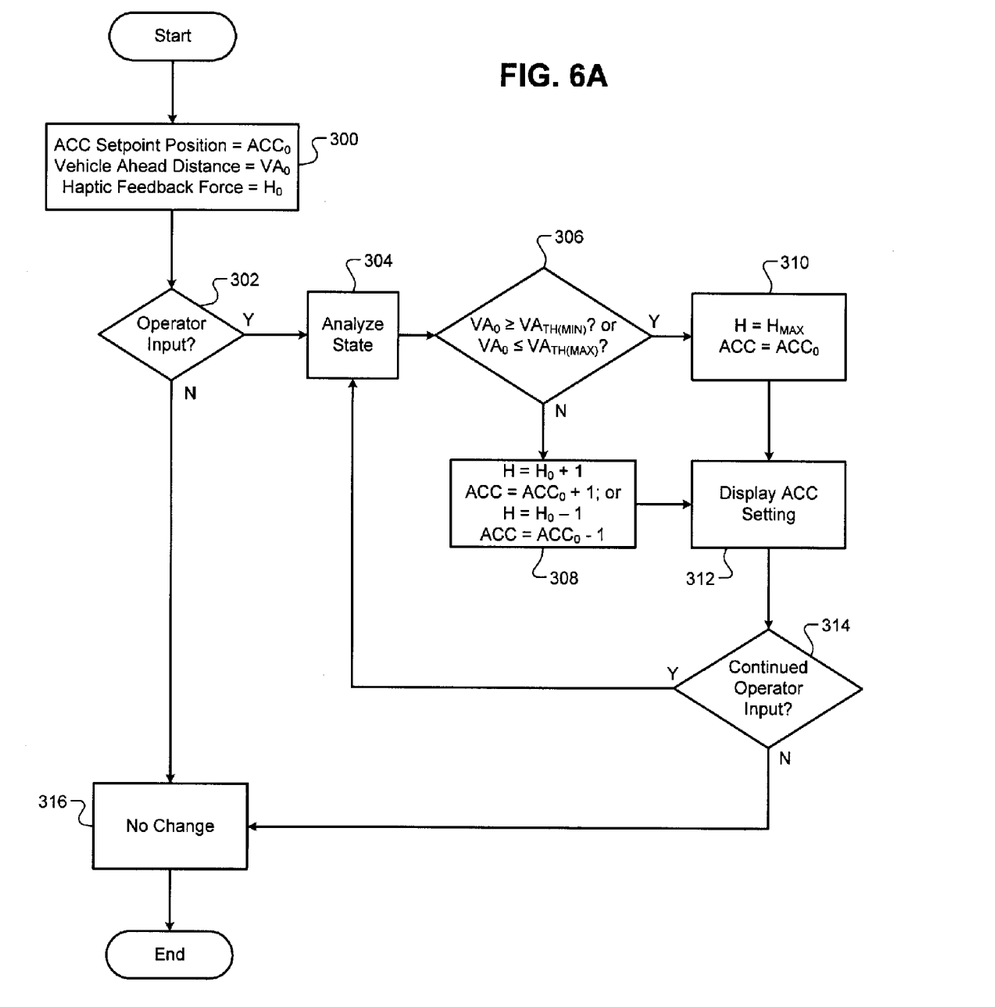
FIG. 6A is a flow diagram illustrating an example method for haptic feedback control in an adaptive cruise control (ACC) system of a vehicle according to one implementation of the present disclosure.

Referring now to FIG. 6A, an example method for haptic feedback control in an ACC system of a vehicle begins at 300. At 300, the control module 20 may set an ACC set point position (ACC), a vehicle ahead distance (VA), and a haptic feedback force (H) to predetermined (i.e., default) levels (ACC$_0$, VA$_0$, and H$_0$, respectively). At 302, the control module 20 detects whether operator input has been received. If true, control may proceed to 304. If false, control may proceed to 316. At 304, the control module 20 may analyze a current state of the ACC system 220. For example, the control module 20 may adjust the vehicle ahead distance VA$_0$ based on current distance measurements.

At 306, the control module 20 may determine whether the vehicle ahead distance VA$_0$ is greater than or equal to a minimum predetermined distance (VA$_{TH(MIN)}$). Alternatively, the control module 20 may determine whether the vehicle ahead distance VA$_0$ is less than or equal to a maximum predetermined distance (VA$_{TH(MAX)}$). If false, control may proceed to 308. If true, control may proceed to 310. At 308, the control module 20 may either increase or decrease the haptic feedback force H and the ACC set point position ACC$_0$ by small predetermined amounts. Control may then proceed to 312. At 310, the control module 20 may set the haptic feedback force H to a maximum amount (H$_{MAX}$) and may set the ACC set point position ACC to the ACC set point position ACC$_0$. Control may then proceed to 312.

At 312, the control module 20 may display the new ACC setting (either increased, decreased, or the same as previous) to the operator 14 via the display device 210. At 314, the control module 20 may determine whether continued operator input has been received. If true, control may return to 304 whether the state of the ACC system 220 may be reanalyzed.

If false, control may proceed to 316. At 316, no change may be applied to the ACC system 220 and control may end. While one haptic feedback control cycle of the ACC system 220 is illustrated, the method may be also be repeated.

Figure 6B:
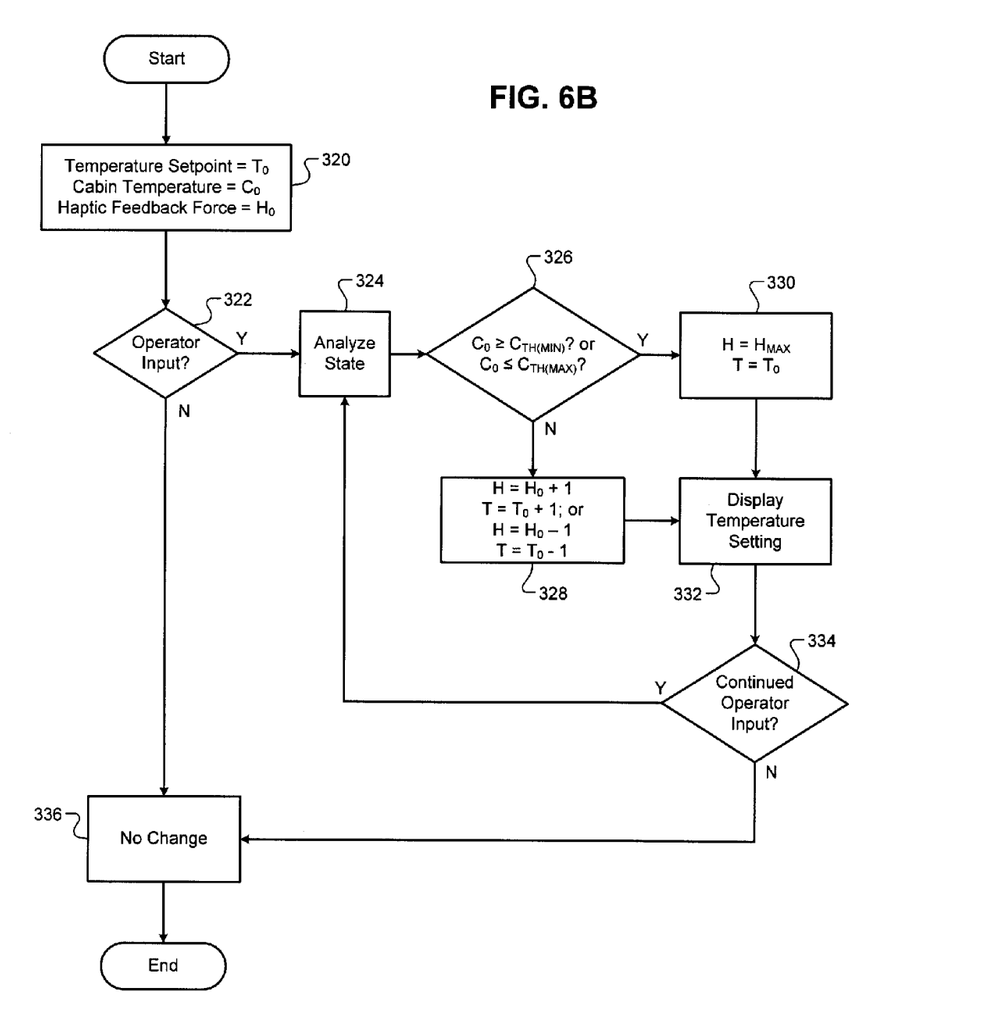
FIG. 6B is a flow diagram illustrating an example method for haptic feedback control in a heating, ventilation, and air conditioning (HVAC) system of a vehicle according to one implementation of the present disclosure.

Referring now to FIG. 6B, an example method for haptic feedback control in an HVAC system 228 of a vehicle begins at 320. At 320, the control module 20 may set temperature set point (T), a cabin temperature (C), and a haptic feedback force (H) to predetermined (i.e., default) levels (T$_0$, C$_0$, and H$_0$, respectively). At 322, the control module 20 detects whether operator input has been received. If true, control may proceed to 324. If false, control may proceed to 336. At 324, the control module 20 may analyze a current state of the HVAC system 228. For example, the control module 20 may adjust the cabin temperature C$_0$ based on current temperature measurements.

At 326, the control module 20 may determine whether the cabin temperature C$_0$ is greater than or equal to a minimum predetermined temperature (C$_{TH(MIN)}$). Alternatively, the control module 20 may determine whether the cabin temperature C$_0$ is less than or equal to a maximum predetermined temperature (C$_{TH(MAX)}$). If false, control may proceed to 328. If true, control may proceed to 330. At 328, the control module 20 may either increase or decrease the haptic feedback force H and the temperature set point T by small predetermined amounts. Control may then proceed to 332. At 330, the control module 20 may set the haptic feedback force H to a maximum amount (H$_{MAX}$) and may set the temperature set point T to the temperature set point T$_0$. Control may then proceed to 332.

At 332, the control module 20 may display the new temperature setting (either increased, decreased, or the same as previous) to the operator 14 via the display device 210. At 334, the control module 20 may determine whether continued operator input has been received. If true, control may return to 334 whether the state of the HVAC system 228 may be reanalyzed. If false, control may proceed to 336. At 336, no change may be applied to the HVAC system 228 and control may end. While one haptic feedback control cycle of the HVAC system 228 is illustrated, the method may be also be repeated.

Figure 6C:
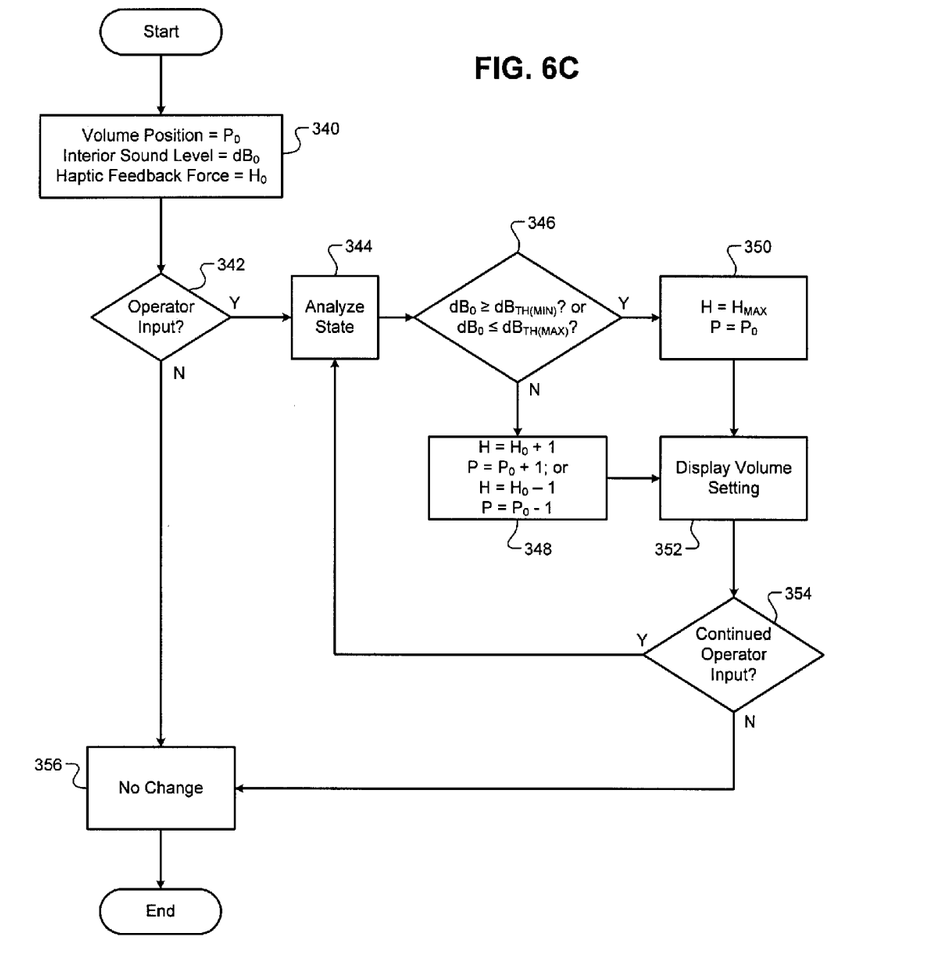
FIGS. 6C-6D are flow diagrams illustrating example methods for haptic feedback control in an audio system of a vehicle according to one implementation of the present disclosure.

Referring now to FIG. 6C, a first example method for haptic feedback control in an audio system of a vehicle begins at 340. At 340, the control module 20 may set a volume position (P), an interior sound level (dB), and a haptic feedback force (H) to predetermined (i.e., default) levels (P$_0$, dB$_0$, and H$_0$, respectively). At 342, the control module 20 detects whether operator input has been received. If true, control may proceed to 344. If false, control may proceed to 356. At 344, the control module 20 may analyze a current state of the audio system 224. For example, the control module 20 may adjust the interior sound level dB$_0$ based on current noise measurements.

At 346, the control module 20 may determine whether the interior sound level dB$_0$ is greater than or equal to a minimum predetermined level (dB$_{TH(MIN)}$). Alternatively, the control module 20 may determine whether the interior sound level dB0 is less than or equal to a maximum predetermined level (dB$_{TH(MAX)}$). If false, control may proceed to 348. If true, control may proceed to 350. At 348, the control module 20 may either increase or decrease the haptic feedback force H and the volume position P by small predetermined amounts. Control may then proceed to 352. At 350, the control module 20 may set the haptic feedback force H to a maximum amount (H$_{MAX}$) and may set the volume position P to the volume set point position P$_0$. Control may then proceed to 352.

At 352, the control module 20 may display the new volume setting (either increased, decreased, or the same as previous)

to the operator 14 via the display device 210. At 314, the control module 20 may determine whether continued operator input has been received. If true, control may return to 354 whether the state of the audio system 224 may be reanalyzed. If false, control may proceed to 356. At 356, no change may be applied to the audio system 224 and control may end. While one haptic feedback control cycle of the audio system 224 is illustrated, the method may be also be repeated.

Figure 6D:
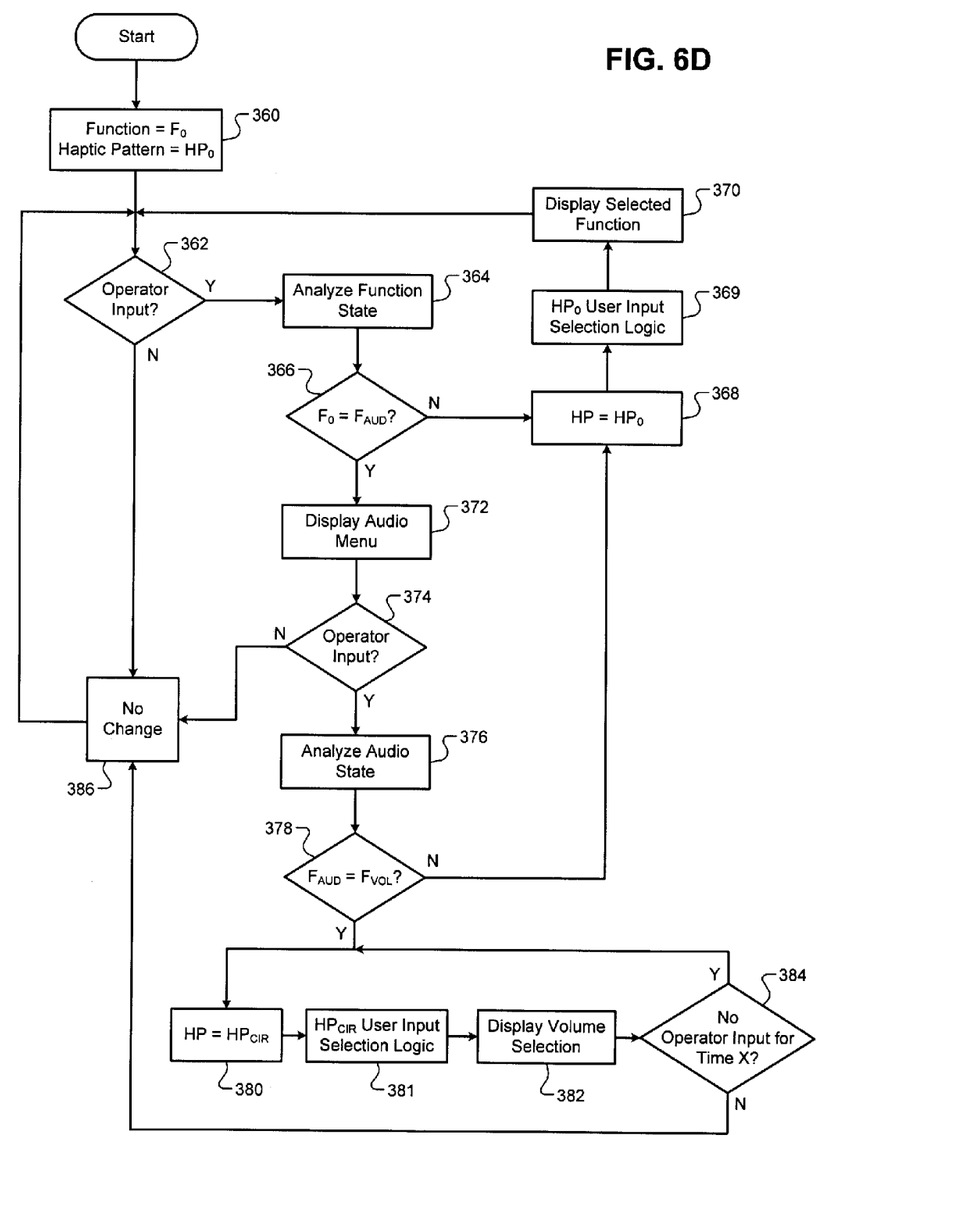

Referring now to FIG. 6D, a second example method for haptic feedback control in an audio system of a vehicle begins at 360. For example, the second example method may be directed to two functions (selection of an audio menu, and selection and corresponding control of audio volume) and an input device 40 having two input configurations (both perpendicular axes and circular). At 360, the control module 20 may set a function and a haptic feedback pattern (HP) to predetermined (i.e., default) values ($F_0$ and $HP_0$, respectively). At 362, the control module 20 detects whether operator input has been received. If true, control may proceed to 364. If false, control may proceed to 386.

At 364, the control module 20 may analyze a current function state. For example, the control module 20 may adjust a selected function $F_0$ based on a current selection. At 366, the control module 20 may determine whether the function $F_0$ is the audio menu ($F_{AUD}$). If false, control may proceed to 368. If true, control may proceed to 372. At 368, the control module 20 may set the haptic feedback pattern HP to the perpendicular axes pattern $HP_0$. At 369, the control module 20 may execute user input selection logic for pattern $HP_0$. At 370, the selected (i.e., non-audio) function may be displayed. Control may then return to 362.

At 372, the control module 20 may display the audio menu to the operator 14 via the display device 210. At 374, the control module 20 may determine whether additional operator input has been received. If true, control may proceed to 376. If false, control may proceed to 386. At 374, the control module 20 may analyze the state of the audio system 224. For example, the control module 20 may adjust the selected audio function $F_{AUD}$ based on a current selection. At 378, the control module 20 may determine whether the selected audio function $F_{AUD}$ is a volume control function ($F_{VOL}$). If false, control may proceed to 368 where the perpendicular axes pattern may continue being used and the other audio function may be displayed to the user. If true, however, control may proceed to 380.

At 380, the control module 20 may set the haptic feedback pattern HP to the circular pattern $HP_{CIR}$. At 381, the control module 20 may execute user input selection logic for pattern $HP_{CIR}$. At 382, the control module 20 may display the volume selection to the operator 14 via the display device 210. At 384, the control module 20 may determine whether no additional operator input has been received for a predetermined period (X). If true, control may return to 380 where additional volume control may continue using the circular pattern $HP_{CIR}$. If false, control may proceed to 386. At 386, no change may occur and control may return to 362. While this method illustrates dual audio functionality via a two-path configuration input device 40, it can be appreciated that additional functionality via additional path configurations can be implemented for the other vehicle systems 18.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle, the control system comprising:
a first module selected from an adaptive cruise control system, a heating, ventilation, and air conditioning system, and an audio system, the first module receiving input from an operator of the vehicle via an input device, said input device selected from and comprising of at least one of a joystick, an electroactive polymer over a printed circuit board, and a steering wheel input device, wherein the operator input includes a change to an operating parameter of a vehicle system; and
a second module that selectively adjusts a resistance to the input of the input device based on the change in the operating parameter, wherein:
the second module increases the resistance by a predetermined amount such that the resistance incrementally increases by the predetermined amount when determining that the operating parameter is less than a minimum threshold or the operating parameter is greater than a maximum threshold,
the second module immediately sets the resistance directly to a maximum resistance such that the resistance is increased directly to the maximum resistance when determining that the operating parameter is greater than the minimum threshold and is less than the maximum threshold, and
the predetermined amount is set such that when the resistance is at a default level, the resistance is increased to a value between the default level and the maximum resistance.

2. The control system of claim 1, wherein the second module adjusts the resistance by one of (i) increasing the resistance of the input device by the predetermined amount, (ii) decreasing the resistance of the input device by a predetermined amount, and (iii) setting the resistance of the input device to the maximum resistance.

3. The control system of claim 1, wherein the vehicle system is the adaptive cruise control system, and wherein the operating parameter is a distance between the vehicle and another vehicle.

4. The control system of claim 1, wherein the vehicle system is the heating, ventilation, and air conditioning system, and wherein the operating parameter is a temperature inside a cabin of the vehicle.

5. The control system of claim 1, wherein the vehicle system is the audio system, and wherein the operating parameter includes at least one of (i) audio volume and (ii) audio data output.

6. The system of claim 1, wherein the input device is the joystick that includes one or more direct current motors connected to a moveable member, and wherein the second module selectively adjusts the resistance of the one or more direct current motors proportional to the change in the operating parameter.

7. The system of claim 1, wherein the input device is an electroactive polymer layer having an associated printed circuit board connected underneath, and wherein the second module selectively calibrates the printed circuit board proportional to the change in the operating parameter.

8. The system of claim 1, wherein the second module selectively adjusts the resistance of the input device proportional to the change in the operating parameter using one of linear adjustment, non-linear adjustment and exponential adjustment.

9. The system of claim 1, wherein the input device is configured to receive at least one of (i) input along two perpendicular paths and (ii) input along a circular path.

10. The system of claim 1, wherein the first module is further configured to receive the operator input via two independent input devices located on a steering wheel of the vehicle with respect to the thumb fingers of the vehicle operator.

11. A method for controlling a vehicle, the method comprising:
receiving input from an operator of the vehicle via an input device, said input device selected from and comprising of at least one of a joystick, an electroactive polymer over a printed circuit board, and a steering wheel input device, wherein the operator input includes a change to an operating parameter of a vehicle system;
selectively adjusting a resistance to the input of the input device based on the change in the operating parameter, wherein selectively adjusting the resistance includes:
increasing the resistance by a predetermined amount such that the resistance is incrementally increased by the predetermined amount when the operating parameter is less than a minimum threshold or the operating parameter is greater than a maximum threshold, and
immediately setting the resistance to a maximum resistance such that the resistance is increased directly to the maximum resistance when determining that the operating parameter is greater than the minimum threshold and is less than the maximum threshold, wherein the predetermined amount is set such that when the resistance is at a default level, the resistance is increased to a value between the default level and the maximum resistance.

12. The method of claim 11, wherein selectively adjusting the resistance of the input device includes one of (i) increasing the resistance of the input device by the predetermined amount, (ii) decreasing the resistance of the input device by a predetermined amount, and (iii) immediately setting the resistance of the input device to the maximum resistance.

13. The method of claim 11, wherein the vehicle system is an adaptive cruise control system, and wherein the operating parameter is a distance between the vehicle and another vehicle.

14. The method of claim 11, wherein the vehicle system is a heating, ventilation, and air conditioning system, and wherein the operating parameter is a temperature inside a cabin of the vehicle.

15. The method of claim 11, wherein the vehicle system is an audio system, and wherein the operating parameter includes at least one of (i) audio volume and (ii) audio data output.

16. The method of claim 11, wherein the input device is the joystick that includes one or more direct current motors connected to a moveable member, and wherein the resistance of the one or more direct current motors is selectively adjusted proportional to the change in the operating parameter.

17. The method of claim 11, wherein the input device is the electroactive polymer over the printed circuit board connected underneath, and wherein the printed circuit board is selectively calibrated proportional to the change in the operating parameter.

18. The method of claim 11, further comprising selectively adjusting the resistance to the input device based proportional to the change in the operating parameter using one of linear adjustment, non-linear adjustment and exponential adjustment.

19. The method of claim 11, wherein the input device is configured to receive at least one of (i) input along two perpendicular paths and (ii) input along a circular path.

20. The method of claim 11, further comprising receiving the operator input via two independent input devices located on a steering wheel of the vehicle with respect to thumb fingers of the vehicle operator.

* * * * *